Figure 1:
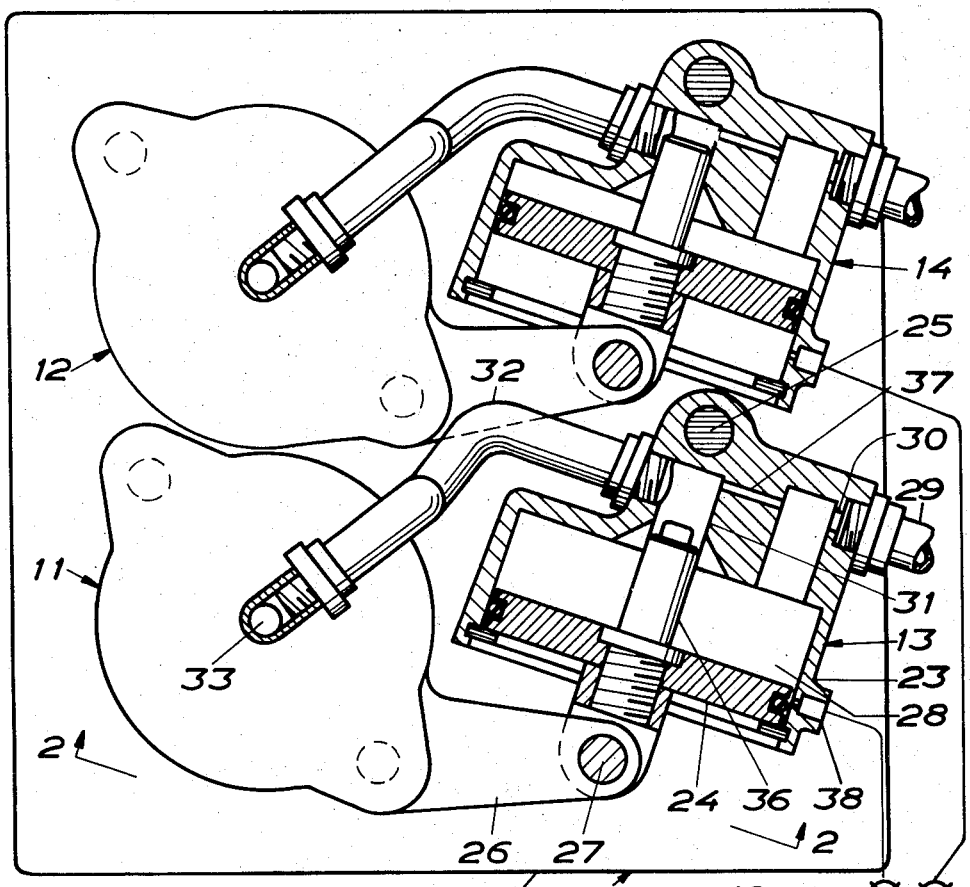

United States Patent [19]
Westerberg

[11] 3,812,744
[45] May 28, 1974

[54] TORQUE CONTROL DEVICE FOR A NUT RUNNER OF THE CONTINUOUS TORQUE TYPE

[75] Inventor: Sven Peter Jonas Westerberg, Saltsjo-Boo, Sweden

[73] Assignee: Atlas Copco Aktiebolag, Nacka, Sweden

[22] Filed: Nov. 20, 1972

[21] Appl. No.: 307,762

[30] Foreign Application Priority Data
Nov. 25, 1971 Sweden.................................. 15131

[52] U.S. Cl.................. 8/52.4 R, 81/57.36, 173/12, 173/52
[51] Int. Cl............................... B25b , B25b 13/00
[58] Field of Search............... 81/52.4, 57.36, 57.39; 173/12, 52

[56] References Cited
UNITED STATES PATENTS

| | | | |
|---|---|---|---|
| 2,691,314 | 10/1954 | Stevens et al...................... | 81/52.4 |
| 2,720,803 | 10/1955 | Rice et al.......................... | 82/52.4 R |
| 2,781,682 | 2/1957 | Herndon............................ | 81/52.4 |
| 2,796,789 | 6/1957 | Rice et al........................ | 81/52.4 R |

*Primary Examiner*—James L. Jones, Jr.
*Attorney, Agent, or Firm*—Flynn & Frishauf

[57] ABSTRACT

A multiple nut runner comprises a frame in which a number of coaxial nut runners are rotatably mounted. Each nut runner has an arm on the housing and a pneumatic cylinder coupled between the arm and the frame so as to transmit the reaction torque to the frame. The cylinder is built together with a control valve that shuts off the motive air to the pneumatic motor of the nut runner in response to the cylinder giving away at a pre-determined torque. The cylinders and the motors as well, are connected to a common adjustable pressure regulator.

15 Claims, 4 Drawing Figures

PATENTED MAY 28 1974

3,812,744

SHEET 1 OF 2

TORQUE CONTROL DEVICE FOR A NUT RUNNER OF THE CONTINUOUS TORQUE TYPE

This invention relates to a torque control device for a nut runner of the continuous torque type. In a torque control device of the prior art, the nut runner is rotatably mounted in a frame and a screw spring is coupled between the nut runner and the frame for transmitting the reaction torque from the nut runner to the frame. Because of the spring characteristics, the reaction force of the spring increases as the spring is being compressed. A pilot valve is controlled by the compression of the spring and it initiates the closing of a valve in the supply conduit of the motor when a predetermined compression of the spring is reached. However, in tightening non-resilient joints the supply of the motor is shut off at a pre-determined torque, but the kinetic energy of the housing of the nut runner causes a further compression of the spring and thereby also an increased reaction force of the spring which results in an over-torque. The final torque will therefore depend on the resiliency of the joint, particularly if the nut runner operates with a high rotary speed. The torque control can be improved somewhat by using a two-speed nut runner that runs the nut down in a high speed and automatically gears down for the final tightening. However, such complicated nut runners are expensive. Another disadvantage in using a screw spring appears when a plurality of nut runners are fastened to a common frame, a so called multiple nut runner unit. The final torque must then be adjusted individually for the nut runners and individual systematic errors can easily appear.

It is therefore an object of the invention to provide for a torque control that gives a final torque that is not influenced by the resiliency of the joint. Another object is to provide for such a torque control that permits a common adjustment of the final torque imparted by the nut runners of a multiple unit. Still another object is to provide for a torque control that automatically compensates for the influence of the moment of inertia of the nut runner at various rotary speed.

Figure 3:
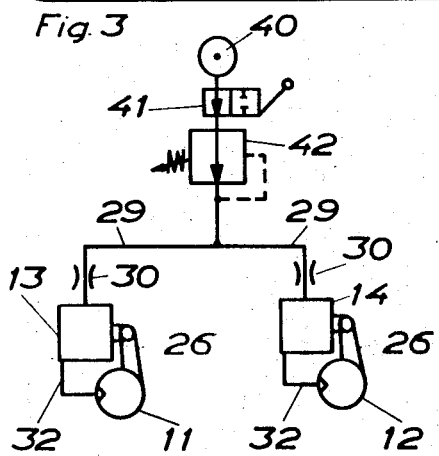
Figure 4:
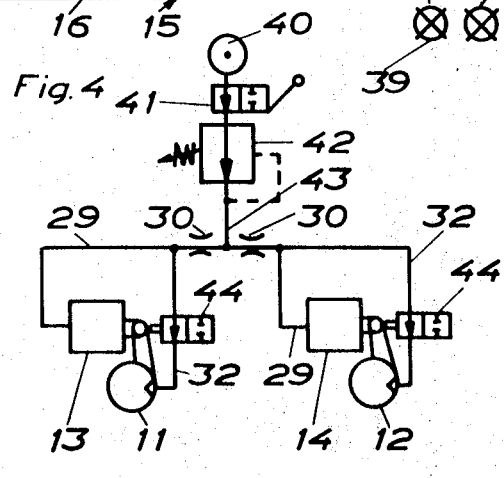
Figure 2:
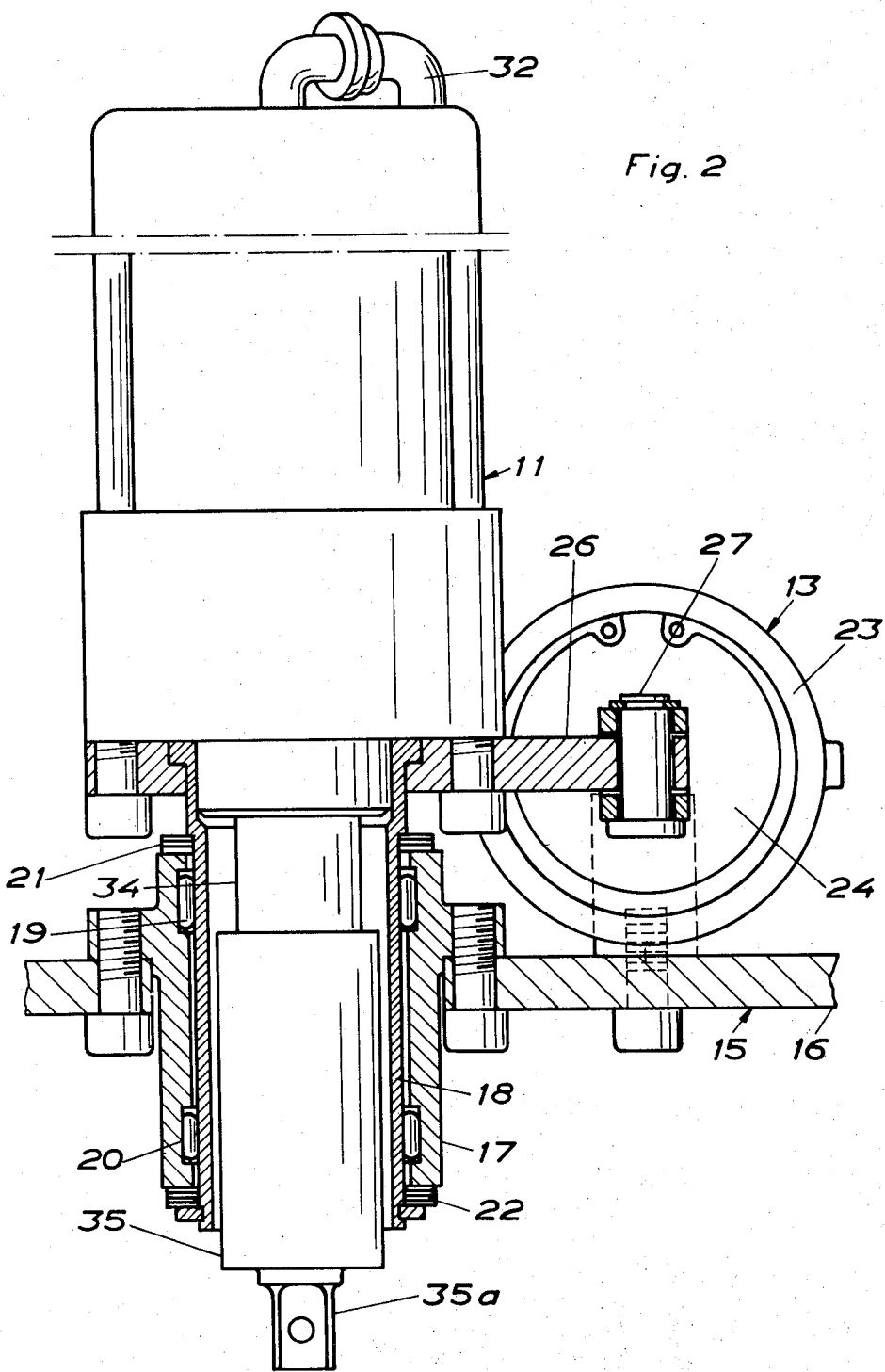

The invention will be further described with reference to the accompanying drawings in which FIG. 1 is a horizontal view of two nut runners arranged with a torque control according to the invention and mounted in a common frame, FIG. 2 is a side view, partly in section, seen as indicated by the arrows 2—2 in FIG. 1 but showing only one of the nut runners, FIG. 3 is a circuit diagram for the nut runners shown in FIG. 1, and FIG. 4 is an alternative circuit diagram for the nut runner in FIG. 1.

The two nut runners in FIG. 1 have been designated by 11,12 and their devices for taking up the reaction torque have been designated by 13,14. Since these two devices and the two nut runners are identical and identically mounted, reference is made only to one of them in the detailed description. The nut runners are mounted in a frame 15 which comprises a gangplate 16 with fixed sleeves 17 for receiving the nut runners. The housing of the nut runner 11 has a sleeve-like extension 18 which is journalled in the sleeve 17 by means of roller bearings 19,20. Axially directed forces between the fixed sleeve 17 and the nut runner 11,18 are taken up in washers 21,22. The device 13 for taking up the reaction torque from the nut runner 11, as well as the device 14, comprises a cylinder 23 and a piston 24 slidable in the cylinder. The cylinder 23 is pivotally mounted on an upright pivot 25 fixed on the frame 15, and an arm 26 on the housing of the nut runner is pivotally jointed to the piston 24 by means of a pivot 27. The cylinder chamber of the cylinder 23, designated by 28, is supplied with compressed air through a conduit 29 and a restriction 30 so that the piston 24 is normally held by the air pressure in the position shown in FIG. 1. From the cylinder chamber 18, the air flows to a cylindrical bore 31 and from there through a flexible conduit 32 to the inlet 33 of the motor of the nut runner. The motor of the nut runner, — represented by reference numeral 33 as well — is suitably a pneumatic sliding vane motor. It rotates a spindle 34 on which a sleeve 35 is attached so as to be unturnable but limitedly axially slidable relative thereto and spring biased outwardly. The outer part of the sleeve 35 is formed as a drive square 35a on which a nut socket can be attached. The piston 24 has a cylindrical portion 36 which together with the cylindrical bore 31 forms a control valve that can shut off the motive air to the motor of the nut runner. The nut runner 12 and its device 14 for taking up the reaction torque are shown in the position in which the control valve 31,36 of the device 14 is closed. A leak channel 37 is suited to almost compensate for the leakage through the motor. The cylinder 23 has an outlet 38 that is connected by means of a hose to a pneumatically controlled indicating device, for instance an indicator flag 39.

The movement of the piston as a result of the reaction torque (imparted on the piston by means of arm 26) slightly exceeding the loading pressure on the piston provided by the input pressure fluid is termed in the specification and the appended claims as a "giving-away movement."

In FIG. 3 is shown the pneumatic circuit with the two nut runners 11,12 and the piston devices 13,14 for taking up their reaction forces. Compressed air is supplied from a source of compressed air 40 through a supply valve 41 to an adjustable pressure regulator 42 for maintaining a constant fluid pressure. The supply valve can alternativaly be connected downstream of the pressure regulator.

When two nuts, screws or the like are to be run down by the multiple nut runner unit, the frame is moved towards the nuts and the nut runners are started by the common supply valve 41. On account of the resilient mounting of the drive sleeve 35, non-illustrated nut sockets will individually engage with the nuts. When the reaction torque of a nut runner reaches a pre-determined value, its associated piston 24 gives away and the cylindrical portion 36 of the piston shuts off the motive air to this nut runner. However, when shutting off the motive air, the piston has still about 75 percent of its available movement left, which always is enough to dampen to stop the turning of the housing of the nut runner. It is to be noted that the piston 24 maintains a practically constant reaction force also if the pressure regulator 42 has the action of a one-way valve since the cylinder chamber 28 is vented through the leak channel 37 and the motor. About simultaneously with the shutting off, the indicator outlet 38 is vented so that its associated indicator 39 indicates tightening to the pre-determined torque.

Each nut runner maintains a constant torque until all the indicators 39 indicate the pre-determined final torque and the supply valve 41 is manually closed. This fact is of great importance particularly for a multiple nut runner unit with many nut runners since for instance a non-parallelity or an elastic gasket in the joint being tightened can result in any nut first tightened to the pre-determined torque being not capable of clamping the joint to parallelity or compress the joint respectively, which a plurality of adjacent nuts do. If, therefore, a nut will be re-tightened when an adjacent nut is being tightened, its assocaited piston 24 will simultaneously move back towards its normal position without changing its reaction force, and the control valve 31,36 will therefore re-open and then again close. The leak passage 37 is suitably dimensioned so as not completely to compensate for the leakage through the motor, and the motor leakage will therefore also result in a slow reciprocatory turning of the housing of the nut runner. If there is no leakage through a channel 37, this reciprocatory swinging will be faster. However, this will have no significant influence on the final torque. The leak channel 37 can of course be replaced by a leakage in the valve 31,36.

The devices 13,14 for taking up the reaction torque are suitably dimensioned so that the nut runners impart a somewhat greater torque e.g. 10 percent greater than the piston 24 can resist at the same air pressure. This relation will then remain almost constant when the pressure regulator 42 is adjusted to provide for various final torques. By the pressure regulator 42, all the devices 13,14 can be simultaneously adjusted to provide precisely the same reaction force. If a nut runner does not reach a sufficient torque, for instance due to wear or on account of too little oil, its associated piston 24 will remain in its normal position, i.e., the position of piston 24 of the device 13 in FIG. 1, so that its associated indicator 39 will never indicate a reached final torque. Such a defect will therefore be discovered immediately so that it can be taken care of.

By means of the restrictions 30, the variations in the dynamic additional torque emanating from the inertia of the nut runner will be automatically compensated for. In non-elastic joints in which there is no resistance to the running down of the nut, the nut runner will have a high rotary speed which, on account of the restrictions 30, will reduce the pressure in the inlet of the motor an thereby also the pressure in the cylinder chamber 28 so that the pistons 24 will give away at a lower torque than the pre-determined. When the pressure then builds up in the cylinder chamber 28 the nut runner will swing back and the control valve 31,36 will again open so that the nut runner will stop with the pre-determined torque constantly imparted to the nut.

In FIG. 4 is shown an alternative circuit diagram in which the motors of the nut runners are connected in parallel with their piston devices 13,14 instead of in series therewith. As in FIG. 3, the supply conduits of the motors have been designated by 32 and the supply conduit to the piston devices 13,14 by 29. The conduit leading from the pressure regulator 42 has been designated by 43. The control and shut-off valves 44 corresponding to the valves 31,36 in FIG. 1 are shown as separate units and not built together with the piston devices 13,14. Instead of the direct acting shut-off valves in the two illustrated circuits it is of course possible to utilize pilot valves which are mechanically controlled by the movement of the pistons 24 and in turn pneumatically control shut-off valves in the supply conduits of the motors.

A pure shut-off action of the valves 31,36 can be achieved simply by mutually shifting the connections of the conduits 29 and 32 to the devices 13, 14. Then, the valves 31,36 remain closed once they have closed. Preferably, a spring should then be inserted in the cylinder chamber 28 to bias the pistons 24 outwardly to their initial positions when the nut runners are removed from nuts just tightened.

What I claim is:

1. A torque control device for a nut runner of the continuous torque type with a housing and a motor in the housing operatively connected to a drive spindle, comprising: a frame to which the nut runner is mounted; a pressure fluid loaded piston device connected to an adjustable pressure regulator and coupled between the nut runner and the frame for transmitting the reaction torque from the nut runner to the frame; and means to shut off the motor of the nut runner in response to a giving-away movement of said piston device.

2. A torque control device as defined in claim 1 in which the housing of the nut runner is rotatably mounted in the frame and said piston device is coupled between the housing and the frame to permit a limited rotation of the housing.

3. A torque control device as defined in claim 1 in which a plurality of nut runners are mounted in a common frame and each nut runner is rotatably mounted in the frame and has its own yieldable reaction torque transmitting piston device coupled to the frame, said piston devices being connected in parallel to said pressure regulator.

4. A torque control device as defined in claim 1 in which the motor of the nut runners is a pressure fluid motor, having its fluid inlet connected to the pressure regulator through a control valve controlled by the piston device so as to substantially shut off the fluid supply to the motor in response to the giving away motion of said piston device.

5. A torque control device as defined in claim 4 in which the control valve is arranged to be forced to a closed or substantially closed position by the piston device within the first half of the length available for the giving-away movement.

6. A torque control device as defined in claim 5 in which the piston device, said control valve and the inlet of the motor are connected in series with said pressure regulator.

7. A torque control device as defined in claim 4 in which the piston device comprises a piston slidable in a cylinder and the piston or a part connected to the piston forms a valving member of said control valve.

8. A torque control device as defined in claim 4 in which the piston device and the motor are connected to said pressure regulator through a common restriction.

9. A torque control device as defined in claim 7 in which said cylinder has an end portion having a cylindrical recess therein which opens into the cylinder, said cylindrical recess and said valving member forming said control valve.

10. A torque control device as defined in claim 9 wherein said cylindrical recess in said end portion is coaxial with said cylinder.

11. A torque control device as defined in claim 7 in which the piston is connected to an arm fixed to the housing of the nut runner and the cylinder is mounted on the frame.

12. A torque control device for a nut runner as defined in claim 7 in which a fluid operated indicator is connected to a port in the cylinder, the port being located so as to be passed by the piston during a normal giving away motion of the piston.

13. A torque control device as defined in claim 1 in which the motor of the nut runner is a pressure fluid motor supplied with pressure fluid through a supply passage and said means to shut off the motor comprises a control valve in said supply passage of the motor and controlled by the piston device to shut off the motive fluid to the motor within the first half of the length available for the giving-away movement of the piston device.

14. A multiple nut runner unit for simultaneously running and tightening a plurality of nuts, screws or the like, comprising: a frame; a plurality of nut runners each comprising a spindle and a pneumatic motor for rotating the spindle when supplied with motive air through a supply passage, and each being mounted to the frame to be rotatable about the axis of its spindle; a plurality of pneumatic piston devices, each being coupled between the housing of one respective nut runner and the frame for transmitting the reaction torque from its respective nut runner to the frame; an adjustable pressure regulator connected to a source of compressed air and connected to all said piston devices; and shut-off valves, each being connected in the supply passage of the motor of one respective nut runner and being responsive to a giving-away movement of the piston device coupled to the respective nut runner.

15. A torque control device as defined in claim 14 in which the piston device and the motor of each nut runner are connected to said pressure regulator through a common restriction.

* * * * *